United States Patent
Chiang et al.

(10) Patent No.: US 11,204,240 B2
(45) Date of Patent: Dec. 21, 2021

(54) STRAIN MEASUREMENT METHOD AND STRAIN MEASUREMENT APPARATUS

(71) Applicant: Industrial Technology Research Institute, Hsinchu (TW)

(72) Inventors: I-Hung Chiang, Changhua County (TW); Hung-Hsien Ko, Hsinchu County (TW); Cheng-Ta Pan, Kaohsiung (TW); Yu-Lin Hsu, Tainan (TW); Kuo-Hua Tseng, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/937,592

(22) Filed: Jul. 24, 2020

(65) Prior Publication Data

US 2021/0356403 A1    Nov. 18, 2021

(30) Foreign Application Priority Data

May 14, 2020   (TW) ................................ 109116033

(51) Int. Cl.
  *G01B 11/16*   (2006.01)
  *G01N 21/88*   (2006.01)
  *G06T 7/55*   (2017.01)

(52) U.S. Cl.
  CPC ......... *G01B 11/16* (2013.01); *G01N 21/8803* (2013.01); *G01N 21/8851* (2013.01);
  (Continued)

(58) Field of Classification Search
  CPC ........... G01N 3/068; G01N 2203/0016; G01N 2203/0017; G01N 2203/0019;
  (Continued)

(56) References Cited

U.S. PATENT DOCUMENTS

| | | | | | |
|---|---|---|---|---|---|
| 6,563,129 | B1 * | 5/2003 | Knobel | ................... | G01B 11/16 250/559.04 |
| 7,344,498 | B1 * | 3/2008 | Doughty | .............. | A61B 5/0059 600/306 |

(Continued)

FOREIGN PATENT DOCUMENTS

| CN | 109410199 | 3/2019 |
|---|---|---|
| GN | 105547834 | 5/2016 |

(Continued)

OTHER PUBLICATIONS

"Notice of Allowance of Taiwan Counterpart Application," dated Jan. 28, 2021, pp. 1-4.

*Primary Examiner* — Gordon J Stock, Jr.
(74) *Attorney, Agent, or Firm* — JCIPRNET

(57) ABSTRACT

A strain measurement method includes disposing a 3D camera module at a first measurement position; using the 3D camera module to acquire a first 3D image of a to-be-measured object at a first to-be-measured position; acquiring a second 3D image of the to-be-measured object at the first to-be-measured position; and splicing the first and second 3D images to obtain an initial 3D image. The method still includes: moving the 3D camera module from the first measurement position to a second measurement position; using the 3D camera module to acquire a third 3D image of the to-be-measured object at a second to-be-measured position; acquiring a fourth 3D image of the to-be-measured object at the second to-be-measured position; and splicing
(Continued)

the third and fourth 3D images to obtain a deformed 3D image. The method further includes comparing the initial 3D image and the deformed 3D image to output 3D deformation information.

18 Claims, 5 Drawing Sheets

(52) U.S. Cl.
CPC ............ *G06T 7/55* (2017.01); *G01B 2210/52* (2013.01); *G01N 2021/887* (2013.01); *G01N 2021/8877* (2013.01); *G01N 2203/0647* (2013.01)

(58) Field of Classification Search
CPC ..... G01N 2203/006; G01N 2203/0062; G01N 2203/0067; G01N 2203/0069; G01N 2203/0071; G01N 2203/0073; G01N 2203/0075; G01N 2203/0641; G01N 2203/0647; G01N 21/84; G01N 21/86; G01N 21/88; G01N 21/8803; G01N 21/8851; G01N 21/892; G01N 21/89; G01N 21/8901; G01N 21/8903; G01N 2021/8887; G01N 2021/887; G01N 2021/8877; G01N 2021/8909; G01N 2021/8914; G01N 2021/8915; G01B 2210/52; G01B 11/16; G01B 11/165; G01B 11/24; G01B 11/245; G06T 2200/04; G06T 2207/30108; G06T 2207/30124; G06T 2207/30164; G06T 7/285; G06T 7/55; G06T 7/593; G06T 7/596

See application file for complete search history.

(56) References Cited

U.S. PATENT DOCUMENTS

| | | | | |
|---|---|---|---|---|
| 8,600,147 | B2* | 12/2013 | Iliopoulos | G01M 11/081 |
| | | | | 382/141 |
| 8,803,943 | B2* | 8/2014 | Huang | H04N 13/246 |
| | | | | 348/36 |
| 9,046,353 | B2 | 6/2015 | Michopoulos et al. | |
| 9,262,840 | B2* | 2/2016 | Schreier | G06T 7/579 |
| 9,311,566 | B2* | 4/2016 | Iliopoulos | G01N 3/068 |
| 9,939,257 | B2* | 4/2018 | Wieneke | G01B 11/2513 |
| 9,976,968 | B2* | 5/2018 | Ito | G01L 5/00 |
| 9,998,719 | B2* | 6/2018 | Wang | H04N 9/3185 |
| 10,215,674 | B2 | 2/2019 | Sweet et al. | |
| 10,295,332 | B2* | 5/2019 | Nakayama | B32B 27/08 |
| 10,330,465 | B2* | 6/2019 | Byrne | G01B 11/16 |
| 10,451,519 | B2* | 10/2019 | Likins, Jr. | G01L 1/103 |
| 10,488,311 | B2* | 11/2019 | Imagawa | G01M 5/0058 |
| 10,504,761 | B2* | 12/2019 | Amanullah | G01B 11/245 |
| 10,555,697 | B2* | 2/2020 | Obropta, Jr. | A61B 5/442 |
| 10,796,425 | B1* | 10/2020 | Patel | B64C 39/024 |
| 10,845,187 | B2* | 11/2020 | Kontsos | G01N 21/93 |
| 10,908,055 | B2* | 2/2021 | Thambi | G01B 11/16 |
| 10,928,193 | B2* | 2/2021 | Allen | H04N 13/246 |
| 2019/0017968 | A1 | 1/2019 | Kontsos et al. | |
| 2019/0385326 | A1* | 12/2019 | Baqersad | G01B 11/16 |
| 2020/0264082 | A1* | 8/2020 | Shao | G06T 7/246 |

FOREIGN PATENT DOCUMENTS

| | | |
|---|---|---|
| TW | I438399 | 5/2014 |
| WO | 2019053249 | 3/2019 |

* cited by examiner

STRAIN MEASUREMENT METHOD AND STRAIN MEASUREMENT APPARATUS

CROSS-REFERENCE TO RELATED APPLICATION

This application claims the priority benefit of Taiwan application no. 109116033, filed on May 14, 2020. The entirety of the above-mentioned patent application is hereby incorporated by reference herein.

TECHNICAL FIELD

The disclosure relates to a strain measurement method and a strain measurement apparatus.

BACKGROUND

Strain measurement has been applied to bridges, roads, and buildings to monitor deformation and cracks caused by time changes. In addition, strain measurement is also applied to large area fabric design and instrument actuation path design. At present, the strain measurement methods for large scale on the market mainly use optical devices, such as a strain measurement apparatus using a digital image correlation (DIC) method.

A smallest size that the apparatus can recognize will be affected by a measurement range. When a camera resolution is fixed, because a grid is equal to the measurement range divided by the camera resolution, features smaller than the grid cannot be recognized. Therefore, when the measurement range is larger (i.e., an observation range becomes larger or a moving distance of the object becomes larger), the degree of recognition decreases. However, according to the current camera resolution technology, it is difficult to achieve a strain measurement with high resolution for large scale movement or large area. Accordingly, how to achieve the strain measurement for large scale movement or large area under existing camera technology is the goal of those skilled in the art.

SUMMARY

The exemplary embodiments of the disclosure provide a strain measurement method and a strain measurement apparatus, which can achieve the strain measurement for large scale movement or large area with limited camera resolution.

According to an exemplary embodiment of the disclosure, a strain measurement method is provided and includes: disposing a 3D camera module at a first measurement position; using the 3D camera module to acquire a first 3D image of a to-be-measured object at a first to-be-measured position; acquiring a second 3D image of the to-be-measured object at the first to-be-measured position; and splicing the first 3D image and the second 3D image to obtain an initial 3D image. The method still includes: moving the 3D camera module from the first measurement position to a second measurement position; using the 3D camera module to acquire a third 3D image of the to-be-measured object at a second to-be-measured position; acquiring a fourth 3D image of the to-be-measured object at the second to-be-measured position; and splicing the third 3D image and the fourth 3D image to obtain a deformed 3D image. The method further includes comparing the initial 3D image and the deformed 3D image to output 3D deformation information.

According to an exemplary embodiment of the disclosure, a strain measurement apparatus is provided and includes a measuring device, a controller and an image processor. The measuring device has a 3D camera module. The controller is coupled to the measuring device, and configured to control a movement of the measuring device and operate the 3D camera module. The image processor is coupled to the measuring device. The controller controls the 3D camera module at a first measurement position to acquire a first 3D image of a to-be-measured object at a first to-be-measured position, and controls the measuring device to acquire a second 3D image of the to-be-measured object at the first to-be-measured position. The image processor splices the first 3D image and the second 3D image to obtain an initial 3D image. The controller controls the measuring device to move the 3D camera module from the first measurement position to a second measurement position, controls the 3D camera module to acquire a third 3D image of the to-be-measured object at a second to-be-measured position, and controls the measuring device to acquire a fourth 3D image of the to-be-measured object at the second to-be-measured position. The image processor splices the third 3D image and the fourth 3D image to obtain a deformed 3D image, and compares the initial 3D image and the deformed 3D image to output 3D deformation information.

DETAILED DESCRIPTION

Figure 1:
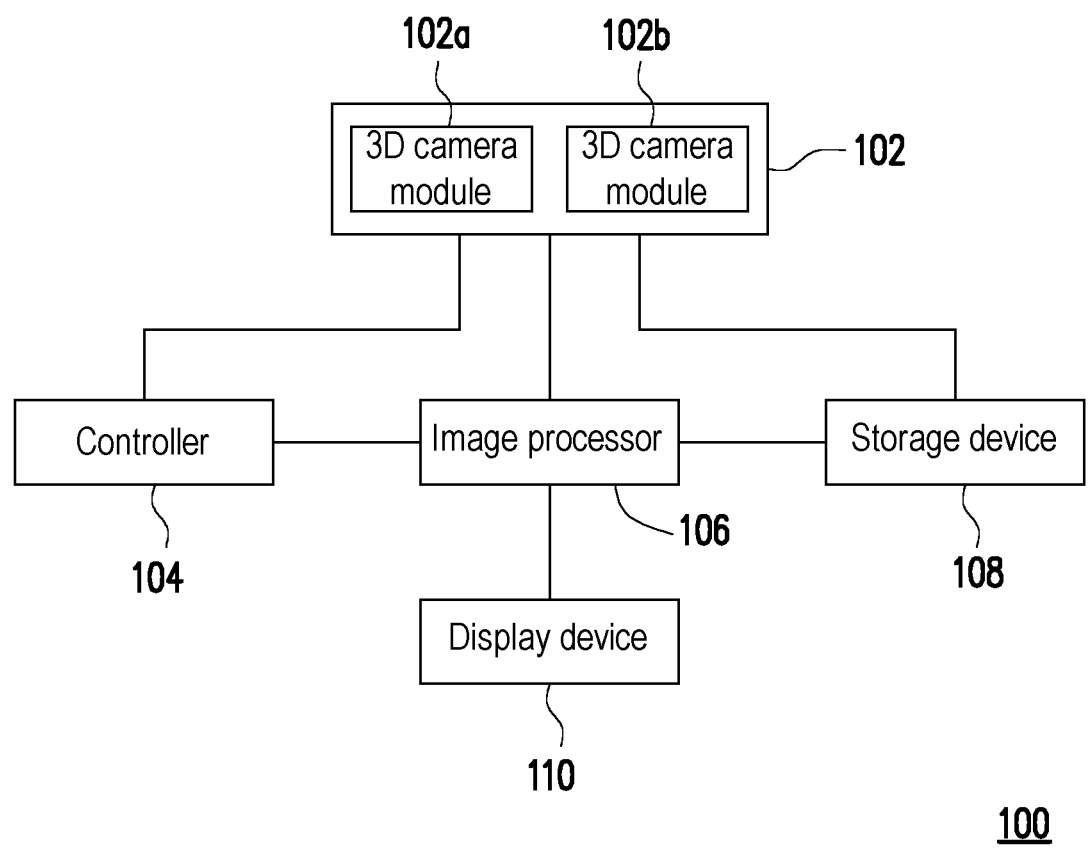
FIG. 1 is a block diagram of a strain measurement apparatus illustrated according to an exemplary embodiment of the disclosure.

FIG. 1 is a block diagram of a strain measurement apparatus illustrated according to an exemplary embodiment of the disclosure.

Referring to FIG. 1, a strain measurement apparatus 100 includes a measuring device 102, a controller 104, an image processor 106, a storage device 108 and a display device 110.

The measuring device 102 has a 3D camera module 102*a* and a 3D camera module 102*b*. The 3D camera module 102*a* and the 3D camera module 102*b* are configured to obtain 3D images of a to-be-measured object. For example, the 3D camera module 102*a* or the 3D camera module 102*b* is disposed with two lenses for simultaneously taking two pictures from two angles, and the two pictures are synthesized to generate the 3D images.

The controller 104 is coupled to the measuring device 102, and configured to control the measuring device 102. In particular, the controller 104 may control a movement of the measuring device 102 according to a position of the to-be-measured object, so as to adjust shooting positions of the 3D camera module 102*a* and the 3D camera module 102*b*.

Further, while controlling the 3D camera module 102a and the 3D camera module 102b to be at measurement positions, the 3D camera module 102a and the 3D camera module 102b are activated to obtain the 3D images of the to-be-measured object.

Figure 2:
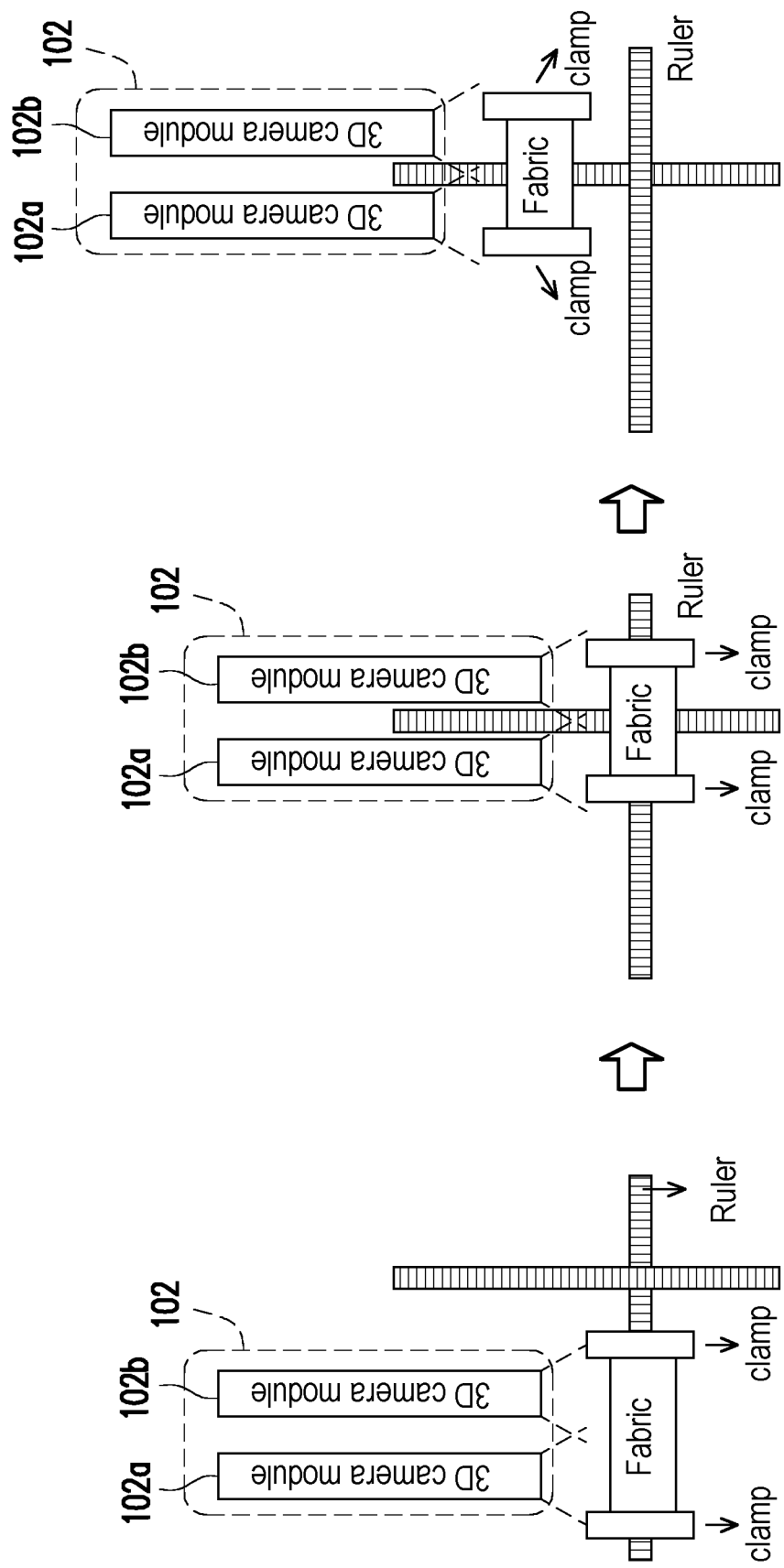
FIG. 2 is a schematic diagram for controlling a measuring device to move illustrated according to an exemplary embodiment of the disclosure.

FIG. 2 is a schematic diagram for controlling a measuring device to move illustrated according to an exemplary embodiment of the disclosure.

Referring to FIG. 2, the controller 104 controls the measuring device 102 so that capturing ranges of 3D camera module 102a and the 3D camera module 102b can cover the to-be-measured object (e.g., a fabric) entirely.

Then, when the fabric shortens and moves horizontally, the controller 104 controls the measuring device 102 to follow the fabric. Further, when the fabric shortens more and moves in a depth of field direction, the controller 104 also controls the measuring device 102 to follow the fabric.

Referring to FIG. 1 again, the image processor 106 is coupled to the measuring device 102, and configured to process the 3D images obtained by the measuring device 102. The image processor 106 may be, for example, a processor for general purposes, a processor for special purposes, a conventional processor, a data signal processor, a plurality of microprocessors, one or more microprocessors, controllers, microcontrollers and Application Specific Integrated Circuit (ASIC) which are combined to a core of the digital signal processor, a Field Programmable Gate Array (FPGA), any other integrated circuits, a state machine, a processor based on Advanced RISC Machine (ARM) and similar products.

The storage device 108 is coupled to the measuring device 102 and the image processor 106, and configured to store the 3D images obtained by the measuring device 102 and the processed 3D images of the image processor 106. The storage device 108 may be, for example, any fixed or movable device including a RAM (Random Access Memory), a ROM (Read-Only Memory), a flash memory, a hard drive or other similar devices or a combination of the above-mentioned devices.

The display device 110 is coupled to the image processor 106, and configured to display the 3D images and information processed by the image processor 106. For example, the display device 110 may be an LED display, an OLED display, a liquid crystal display, a transparent display, a flexible display or other suitable display types.

In this exemplary embodiment, after the 3D camera module 102a and the 3D camera module 102b obtains two 3D images by shooting the to-be-measured object, the image processor 106 splices the obtained two 3D images to obtain a large scale 3D image. As described above, when the observation ranges of the three-dimensional camera module 102a and the three-dimensional camera module 102b are larger, the degree of recognition is lower. Therefore, in this exemplary embodiment, the controller 104 controls the measurement device 102 to reduce the measurement range of each of the 3D camera modules, and the image processor 106 splices the 3D images acquired by the multiple 3D camera modules to increase an overall measurement range. Accordingly, a recognizable range of the to-be-measured object may be increased.

In this exemplary embodiment, the image processor 106 performs feature point description, image matching and image splicing fusion operations on the 3D images acquired by the 3D camera module 102a and the 3D camera module 102b to splice the 3D images.

For example, in the feature point description, the image processor 106 may use the BRISK algorithm to find feature points of the 3D image. However, the disclosure is not limited in this regard. In another exemplary embodiment, the image processor 106 may also use the Harris algorithm, the SIFT algorithm and the SURF algorithm to find the feature points of the 3D image.

For example, in the image matching operation, the image processor 106 uses the Second-Closest Neighbor method to calculate a next-closest distance (Second-Closest Neighbor) in addition to calculating a closest distance (Closest Neighbor) when the feature points of the 3D image are placed into another 3D image to find a matching. If a ratio of these two distances is greater than 0.8, it means that the matching of this group is so similar that the matching of this group may be eliminated. Conversely, if the ratio of these two distances is less than 0.8, it means that the matching of this group is unique and discriminative enough to be kept. It should be understood that the disclosure is not limited to in this regard. In another exemplary embodiment, the image processor 106 may also use the color code comparison method, the affine matching method and the interactive correlation method for the image matching.

For example, in the image splicing fusion operation, the image processor 106 uses the geometric correction method to calculate a root mean square error value of the feature points obtained from the image matching operation, selects the feature points with small errors as parameters of a geometric correction conversion model, then substitutes the feature points into a polynomial geometric correction model to perform a coordinate transformation on one single 3D image, and calibrates different 3D images to the same coordinate system to splice images. Similarly, it should be understood that the disclosure is not limited to in this regard. In another exemplary embodiment, the image processor 106 may also use the complementary image fusion method and the multi-band mixing method to splice images.

In this exemplary embodiment, the image processor 106 stores the spliced 3D image in the storage device 108, and determines a deformation of the to-be-measured object by comparing the 3D images spliced at different times. Specifically, the image processor 106 uses the digital image correlation (DIC) method to obtain 3D coordinate movements before and after the deformation of each sub-region on the surface of the to-be-measured object, and then obtains a physical surface topography and 3D deformation information.

For example, if a center point of the sub region on the surface before the deformation of the to-be-measured object is $(x_0, y_0)$ and a certain point inside the sub region before the deformation is $(x,y)$ and becomes $(x',y')$ after the deformation, relative positions before and after the deformation may be expressed as the following equations, wherein $u(x, y)$ and $v(x, y)$ are horizontal and vertical displacements of the to-be-measured object after the deformation:

$$x'=x+u(x,y)$$

$$y'=y+v(x,y)$$

After performing Taylor's expansion on the equations above and omitting the higher-order terms above the second order (since the sub region is very small), the following equations may be obtained, wherein $dx=x-x_0$ and $dy=y-y_0$:

$$x' = x + u_0 + \frac{\partial u}{\partial x}dx + \frac{\partial u}{\partial y}dy$$

-continued $$y' = y + v_0 + \frac{\partial v}{\partial x}dx + \frac{\partial v}{\partial y}dy$$

Based on this, the image processor 106 may obtain deformation information of the to-be-measured object by solving 6 parameters of the digital image correlation method, namely $$\left(u_0, v_0, \frac{\partial u}{\partial x}, \frac{\partial v}{\partial x}, \frac{\partial u}{\partial y}, \frac{\partial v}{\partial y}\right),$$

wherein $(u, v_0)$ are displacement parameters, $$\left(\frac{\partial u}{\partial x}, \frac{\partial v}{\partial x}, \frac{\partial u}{\partial y}, \frac{\partial v}{\partial y}\right)$$

are displacement gradient parameters, and an optimal solution may be found by using the numerical methods (e.g., the thick-thin method or the Newton-Raphson method).

In this exemplary embodiment, after the 3D deformation information of the to-be-measured object is obtained, the image processor 106 outputs this information to the display device 110 to remind a user that the to-be-measured object is deformed.

Figure 3:
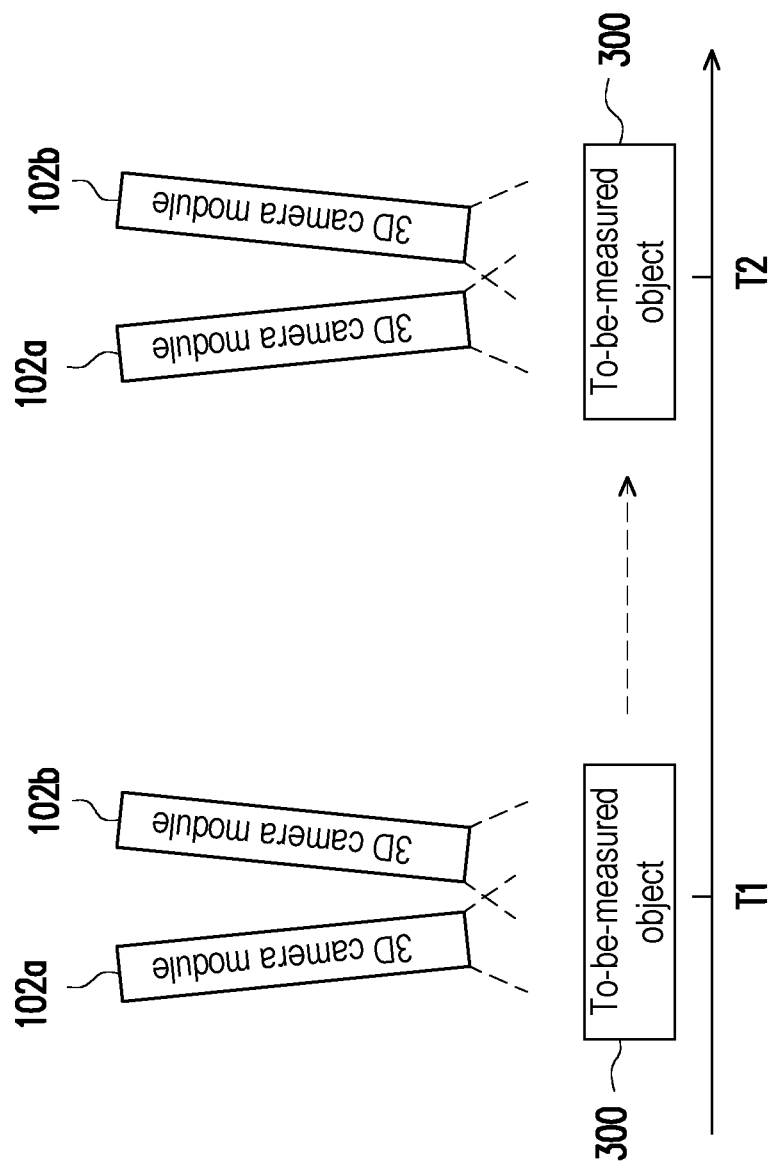
FIG. 3 is a schematic diagram for detecting a to-be-measured object illustrated according to an exemplary embodiment of the disclosure.

FIG. 3 is a schematic diagram for detecting a to-be-measured object illustrated according to an exemplary embodiment of the disclosure.

Referring to FIG. 3, at a timepoint T1, when the to-be-measured object 300 is at a first to-be-measured position, the controller 104 controls the 3D camera module 102a of the measuring device 102 at a first measurement position to acquire a first 3D image of a to-be-measured object 300, and controls the 3D camera module 102b of the measuring device 102 at a third measurement position to acquire a second 3D image of the to-be-measured object 300.

After the acquired first 3D image and the second 3D image are received from the measuring device 102, the image processor 106 splices the first 3D image and the second 3D image to generate a 3D image of the to-be-measured object 300 at the timepoint T1 (hereinafter, referred to as an initial 3D image).

In this exemplary embodiment, the controller 104 controls the measuring device 102 to move in correspondence to a movement of the to-be-measured object 300.

For example, in exemplary embodiment of the disclosure, the strain measurement apparatus 100 may further includes an optical radar and a robot arm. The optical radar will continuously detect a displacement of the to-be-measured object 300 and feed such displacement back to the controller 104. The controller 104 controls the robot arm to correspondingly move the measuring device 102 according to the received displacement, so as to maintain a fixed distance between the measuring device 102 and the to-be-measured object 300.

It should be understood that, the optical radar and the robot arm used to correspondingly move the measurement device 102 is only one example, and the disclosure is not limited thereto. In another exemplary embodiment, the strain measurement apparatus 100 may further include a position detecting device for detecting the displacement of the to-be-measured object 300. Accordingly, the controller 104 controls the movement of the measuring device 102 according to the displacement detected by the position detecting device, so as to maintain the fixed distance between the measuring device 102 and the to-be-measured object 300. Furthermore, in another exemplary embodiment, the measuring device 102 may also be fixed on a rigid fixing member that maintains a fixed distance from the to-be-measured object 300 so that the measuring device 102 may maintain the fixed distance from the to-be-measured object 300 when the to-be-measured object 300 is moved. Alternatively, the user may hold the measurement device 102, and correspondingly move the measurement device 102 according to a visual inspection on the to-be-measured object 300.

At a timepoint T2, when the to-be-measured object 300 is moved to a second to-be-measured position, the controller 104 controls the 3D camera module 102a of the measuring device 102 at a second measurement position to acquire a third 3D image of the to-be-measured object 300, and controls the 3D camera module 102b of the measuring device 102 at a fourth measurement position to acquire a fourths 3D image of the to-be-measured object 300.

After the acquired third 3D image and the fourth 3D image are received from the measuring device 102, the image processor 106 splices the third 3D image and the fourth 3D image to generate a 3D image of the to-be-measured object 300 at the timepoint T2 (hereinafter, referred to as a deformed 3D image).

In addition, the image processor 106 compares the initial 3D image and the deformed 3D image to output the 3D deformation information.

It must be understood that, in this exemplary embodiment, a plurality of 3D camera modules are disposed in the measurement device 102 as an example for description, but the disclosure is not limited to thereto. In another exemplary embodiment, it is also possible that only one single 3D camera module is used.

Figure 4:
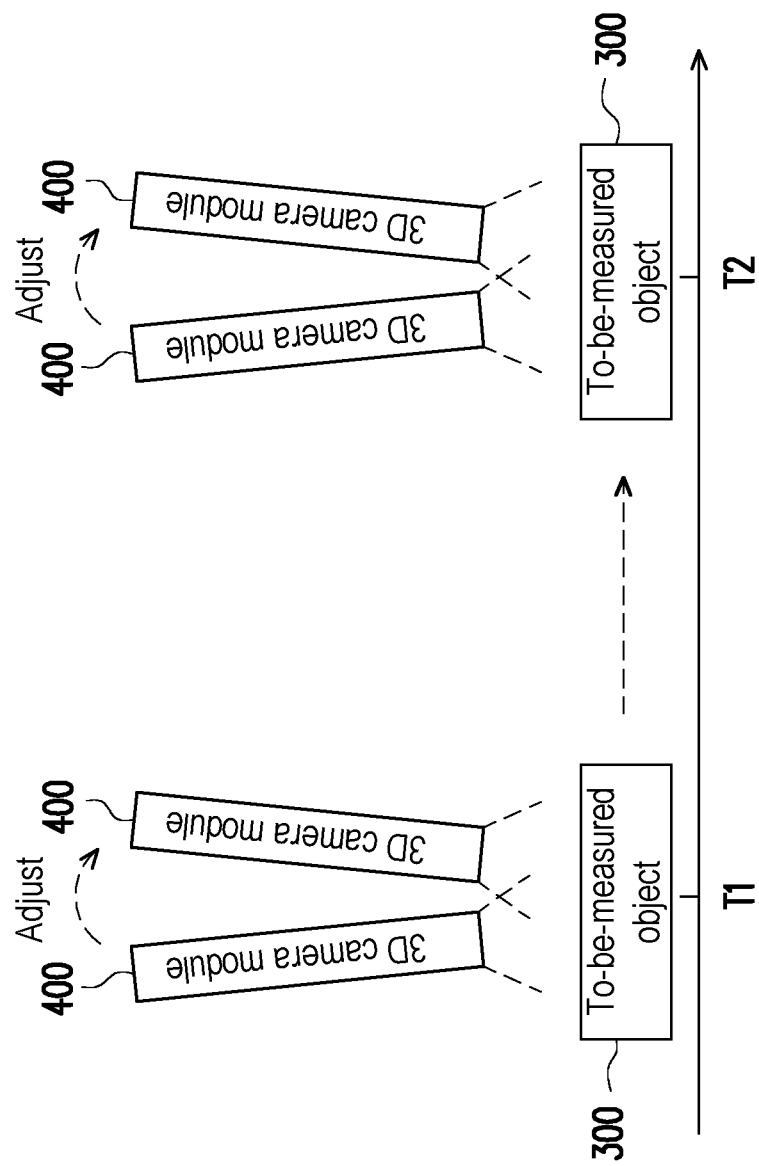
FIG. 4 is a schematic diagram for detecting a to-be-measured object illustrated according to another exemplary embodiment of the disclosure.

FIG. 4 is a schematic diagram for detecting a to-be-measured object illustrated according to another exemplary embodiment of the disclosure.

Referring to FIG. 4, at the timepoint T1, when the to-be-measured object 300 is at a first to-be-measured position, the controller 104 controls a 3D camera module 400 of the measuring device 102 at the first measurement position to acquire the first 3D image of the to-be-measured object 300, and adjusts the 3D camera module 400 to the third measurement position to acquire the second 3D image of the to-be-measured object 300. Similarly, the image processor 106 splices the first 3D image and the second 3D image to generate an initial 3D image of the to-be-measured object 300 at the timepoint T1.

As the to-be-measured object 300 moves, the controller 104 controls the measurement device 102 to move correspondingly.

At the timepoint T2, when the to-be-measured object 300 is moved to the second to-be-measured position, the controller 104 controls the 3D camera module 400 at the second measurement position to acquire the third 3D image of the to-be-measured object 300, and adjusts the 3D camera module 400 to the fourth measurement position to acquire the fourth 3D image of the to-be-measured object 300. Similarly, the image processor 106 splices the third 3D image and the fourth 3D image to generate the deformed 3D image of the to-be-measured object 300 at the timepoint T2. Accordingly, the image processor 106 may compare the initial 3D image and the deformed 3D image to output the 3D deformation information.

Figure 5:
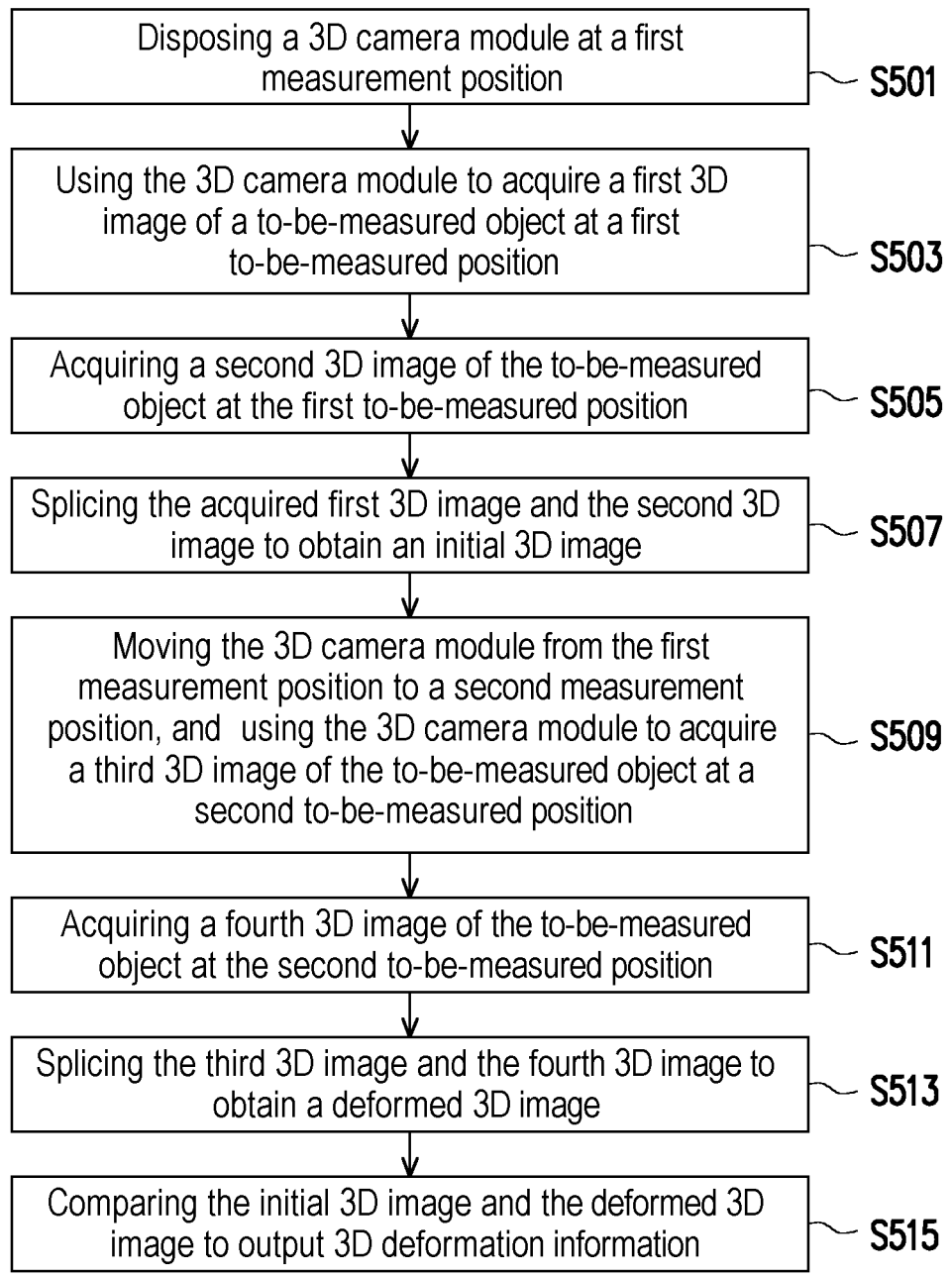
FIG. 5 is a flowchart of a strain measurement method illustrated according to an exemplary embodiment of the disclosure.

FIG. 5 is a flowchart of a strain measurement method illustrated according to an exemplary embodiment of the disclosure.

Referring to FIG. 1, in step S501, a 3D camera module is disposed at a first measurement position. Then, in step S503, the 3D camera module is used to acquire a first 3D image of a to-be-measured object at a first to-be-measured position.

Next, in step S505, a second 3D image of the to-be-measured object at the first to-be-measured position is acquired. As described above, multiple 3D images covering a wide range of the to-be-measured object at the same position may be acquired by adjusting different positions when using one single 3D camera module, or may also be acquired by disposing multiple 3D camera modules.

In step S507, the first 3D image and the second 3D image are spliced to obtain an initial 3D image.

In step S509, the 3D camera module is moved from the first measurement position to a second measurement position, and the 3D camera module is used to acquire a third 3D image of the object at a second to-be-measured position.

Next, in step S511, a fourth 3D image of the to-be-measured object at the second to-be-measured position is acquired. Then, in step S513, the third 3D image and the fourth 3D image are spliced to obtain a deformed 3D image.

Lastly, in step S515, the initial 3D image and the deformed 3D image are compared to output 3D deformation information.

In summary, according to the strain measurement apparatus and method in the embodiments of the disclosure, by performing a dynamical measurement with changes in the position of the 3D camera module and splicing the 3D images captured at different measurement positions, the observation range may be expanded without affecting the recognizable range. In addition, the strain measurement apparatus and method in embodiment of the disclosure, multiple 3D camera modules may be used for dynamically moving and measuring according to the displacement of the to-be-measured object. As a result, a splicing error caused by shaking of the to-be-measured object can be avoided, and the problem that the displacement in the depth of field direction cannot be spliced can be solved.

The invention claimed is:

1. A strain measurement method, comprising:
   disposing a 3D camera module at a first measurement position;
   using the 3D camera module to acquire a first 3D image of a to-be-measured object at a first to-be-measured position;
   acquiring a second 3D image of the to-be-measured object at the first to-be-measured position;
   splicing the first 3D image and the second 3D image to obtain an initial 3D image;
   moving the 3D camera module from the first measurement position to a second measurement position;
   using the 3D camera module to acquire a third 3D image of the to-be-measured object at a second to-be-measured position;
   acquiring a fourth 3D image of the to-be-measured object at the second to-be-measured position;
   splicing the third 3D image and the fourth 3D image to obtain a deformed 3D image; and
   comparing the initial 3D image and the deformed 3D image to output 3D deformation information.

2. The strain measurement method of claim 1, wherein the step of acquiring the second 3D image of the to-be-measured object at the first to-be-measured position comprises:
   adjusting the 3D camera module from the first measurement position to a third measurement position, and using the 3D camera module to acquire the second 3D image of the to-be-measured object at the first to-be-measured position.

3. The strain measurement method of claim 2, wherein the step of acquiring the fourth 3D image of the to-be-measured object at the second to-be-measured position comprises:
   adjusting the 3D camera module from the second measurement position to a fourth measurement position, and using the 3D camera module to acquire the fourth 3D image of the to-be-measured object at the second to-be-measured position.

4. The strain measurement method of claim 1, wherein the step of acquiring the second 3D image of the to-be-measured object at the first to-be-measured position comprises:
   disposing another 3D camera module at a third measurement position, and using the another 3D camera module to acquire the second 3D image of the to-be-measured object at the first to-be-measured position.

5. The strain measurement method of claim 4, wherein the step of acquiring the fourth 3D image of the to-be-measured object at the second to-be-measured position comprises:
   moving the another 3D camera module from the third measurement position to a fourth measurement position; and
   using the another 3D camera module to acquire the fourth 3D image of the to-be-measured object at the second to-be-measured position.

6. The strain measurement method of claim 1, further comprising:
   using an optical radar to detect a displacement of the to-be-measured object, and
   using a robot arm to correspondingly move a measuring device according to the displacement of the to-be-measured object, so as to maintain a fixed distance between the measuring device and the to-be-measured object.

7. The strain measurement method of claim 1, further comprising:
   using a position detecting device to detect a displacement of the to-be-measured object; and
   correspondingly moving a measuring device according to the displacement of the to-be-measured object, so as to maintain a fixed distance between the measuring device and the to-be-measured object.

8. The strain measurement method of claim 1, further comprising:
   installing the 3D camera module on a rigid fixing member, wherein a fixed distance is maintained between the rigid fixing member maintains and the to-be-measured object.

9. A strain measurement apparatus, comprising:
   a measuring device, having a 3D camera module;
   a controller, coupled to the measuring device, and configured to control a movement of the measuring device and operate the 3D camera module; and
   an image processor, coupled to the measuring device,
   wherein the controller controls the 3D camera module at a first measurement position to acquire a first 3D image of a to-be-measured object at a first to-be-measured position, the controller controls the measuring device to acquire a second 3D image of the to-be-measured object at the first to-be-measured position, the image processor splices the first 3D image and the second 3D image to obtain an initial 3D image, the controller controls the measuring device to move the 3D camera module from the first measurement position to a second measurement position, the controller controls the 3D camera module to acquire a third 3D image of the to-be-measured object at a second to-be-measured position, the controller controls the measuring device to acquire a fourth 3D image of the to-be-measured object at the second to-be-measured position, the image processor splices the third 3D image and the fourth 3D image to obtain a deformed 3D image, the image processor compares the initial 3D image and the deformed 3D image to output 3D deformation information.

10. The strain measurement apparatus of claim 9, wherein the controller controls the 3D camera module of the measuring device to be adjusted from the first measurement position to a third measurement position, and controls the 3D camera module to acquire the second 3D image of the to-be-measured object at the first to-be-measured position.

11. The strain measurement apparatus of claim 10, wherein the controller controls the 3D camera module of the measuring device to be adjusted from the second measurement position to a fourth measurement position, and controls the 3D camera module to acquire the fourth 3D image of the to-be-measured object at the second to-be-measured position.

12. The strain measurement apparatus of claim 9, wherein the measuring device further comprises another 3D camera module, the controller controls the another 3D camera module at a third measurement position to acquire the second 3D image of the to-be-measured object at the first to-be-measured position.

13. The strain measurement apparatus of claim 12, wherein the controller controls the measuring device to move the another 3D camera module from the third measurement position to a fourth measurement position, and controls the another 3D camera module to acquire the fourth 3D image of the to-be-measured object at the second to-be-measured position.

14. The strain measurement apparatus of claim 9, further comprising:

an optical radar, coupled to the controller and configured to detect a displacement of the to-be-measured object; and a robot arm, coupled to the controller, wherein the controller controls the robot arm to correspondingly move the measuring device according to the displacement of the to-be-measured object, so as to maintain a fixed distance between the measuring device and the to-be-measured object.

15. The strain measurement apparatus of claim 9, further comprising:

a position detecting device, coupled to the controller and configured to detect a displacement of the to-be-measured object, wherein the controller correspondingly moves the measuring device according to the displacement of the to-be-measured object, so as to maintain a fixed distance between the measuring device and the to-be-measured object.

16. The strain measurement apparatus of claim 9, further comprising:

a rigid fixing member, configured to fix the measuring device, wherein a fixed distance is maintained between the rigid fixing member maintains and the to-be-measured object.

17. The strain measurement apparatus of claim 9, further comprising:

a storage device, coupled to the measuring device, and configured to store the initial 3D image and the deformed 3D image.

18. The strain measurement apparatus of claim 9, further comprising:

a display device, coupled to the image processor, and configured to display the 3D deformation information.

* * * * *